United States Patent [19]

Simpson, Jr.

[11] 4,359,853
[45] Nov. 23, 1982

[54] HARVESTING MACHINE FOR COTTON
[76] Inventor: Russell E. Simpson, Jr., P.O. Box 103, Dell, Ark. 72426
[21] Appl. No.: 203,388
[22] Filed: Oct. 31, 1980
[51] Int. Cl.³ .......................................... A01D 46/12
[52] U.S. Cl. .......................................................... 56/35
[58] Field of Search ..................................... 56/28–40

[56]     References Cited
    U.S. PATENT DOCUMENTS

| | | | |
|---|---|---|---|
| 1,925,625 | 9/1933 | Budd et al. | 56/32 |
| 2,673,438 | 3/1954 | Miller et al. | 56/33 |
| 2,673,439 | 3/1954 | Sanyer et al. | 56/33 |
| 2,702,970 | 3/1955 | Diserens | 56/30 |
| 3,138,912 | 6/1964 | Mays et al. | 56/32 |

Primary Examiner—Robert A. Hafer
Attorney, Agent, or Firm—Harvey B. Jacobson

[57]  ABSTRACT

A cotton harvesting machine which utilizes a novel structure for pulling the mature cotton plant from the burr includes a plurality of paired rotating disks mounted on a drive shaft for rotation in the same relative direction as the movement of the cotton plant through the picking area of the machine, each disk pair being moved into an open position whereby the cotton plant is funnelled between the open disk pair and a closed position whereby the disk pair grips the mature cotton and pulls it from the burr. The opening and closing movement of each disk pair is provided by a pair of cams and associated cam followers, one for each disk in the pair, each cam being mounted in a stationary position around the rotating drive shaft, the cam followers being fastened to each disk and following a path of movement along a cam track during the rotation of the shaft. The cam tracks associated with each pair of cams converge and diverge around the shaft causing the closing and opening position of the disk pair as the cam followers move in the track. An adjusting mechanism can be provided to change the relative positions between opposing disks by relative movement of the associated pair of cams.

17 Claims, 9 Drawing Figures

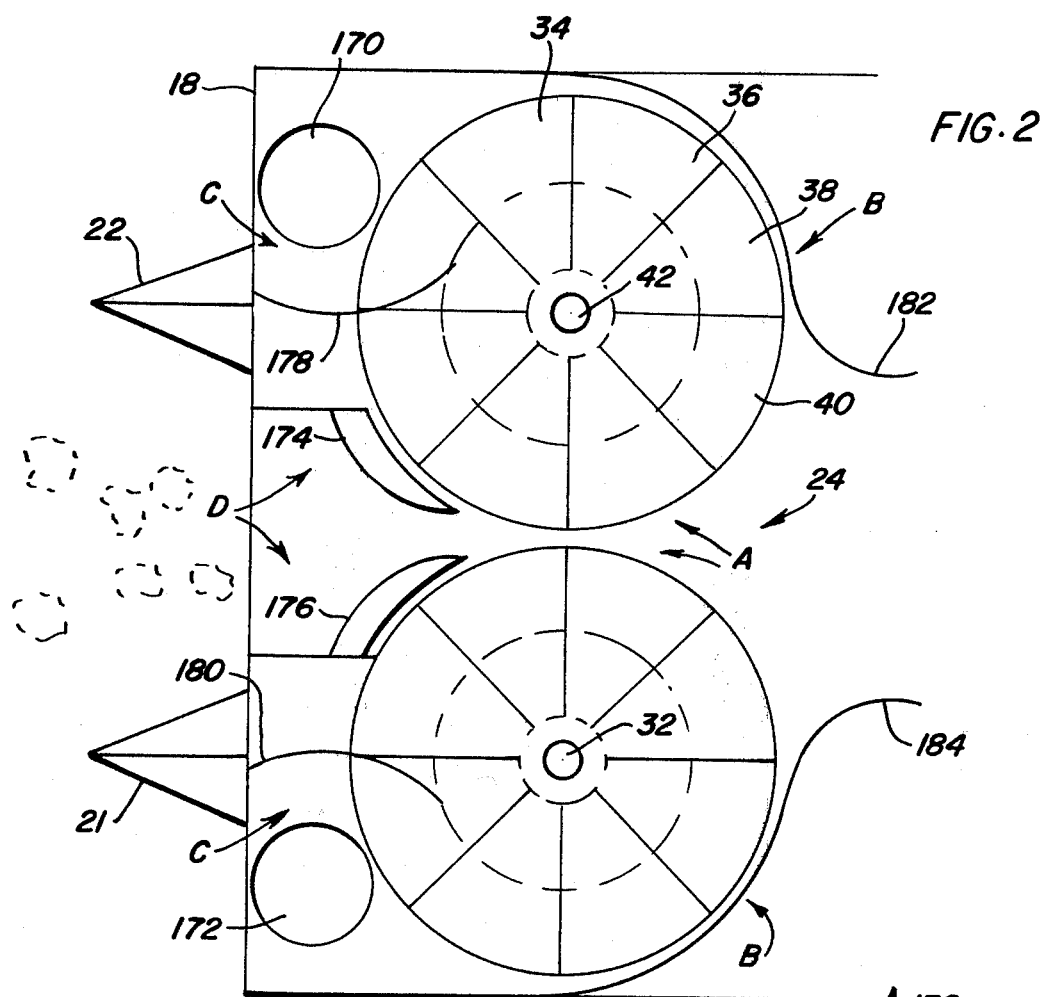
FIG. 2
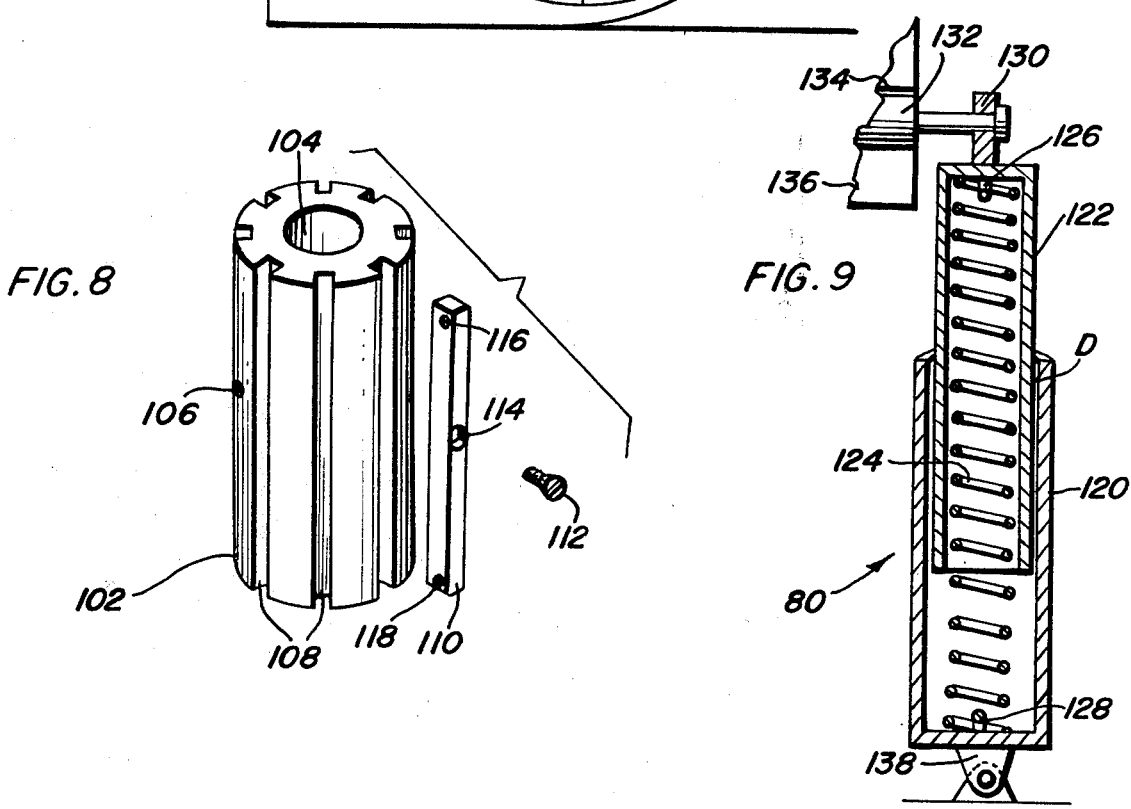
FIG. 8
FIG. 9

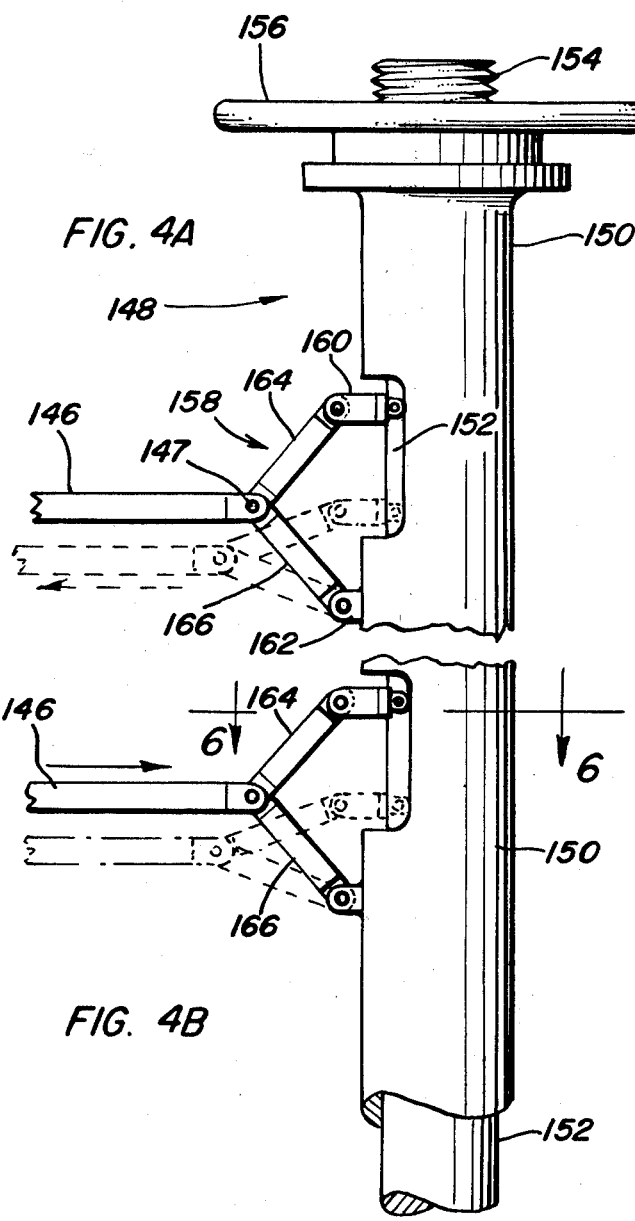
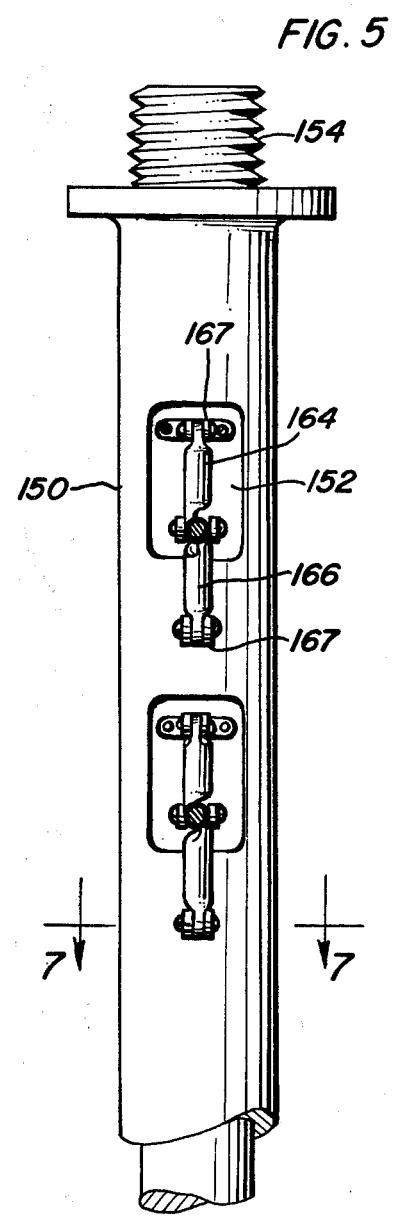
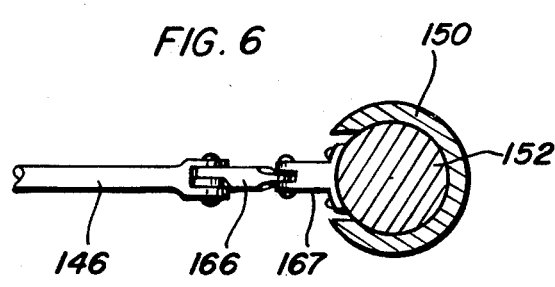
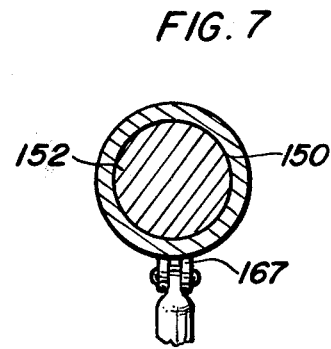

HARVESTING MACHINE FOR COTTON

BACKGROUND OF THE INVENTION

FIELD OF THE INVENTION

This invention relates to machines for harvesting cotton and, in particular, to a novel structure for pulling the mature cotton plant from the stalk or burr.

More particularly, this invention relates to a machine for harvesting cotton which includes a novel paired disk picking mechanism mounted for rotation about a central shaft in which the individual disks of the disk pair are separated to allow a portion of the cotton plant to pass therebetween and which are brought to a closed position to squeeze or pull the mature cotton from the stalk of the plant.

The most widely used mechanical harvesting machine for cotton is the spindle picker in which the mature cotton is collected on a plurality of pins positioned around the rotating spindle arms. Although other machines, characterized as strippers, are used to harvest cotton, such machines gather too much extraneous portions of the cotton plant to obtain the high quality harvest the cotton mills demand. The spindle picker has undergone only minor improvements in design since its widespread introduction in the late 1940's, and although the picking efficiency is very satisfactory, the large mass of individual components in every row unit or header of this type of cotton harvesting machine is disadvantageous for several reasons.

The large amount of components consequently demands a large amount of time for daily maintenance, such as for lubrication, and seasonal attention to replace worn parts which comprise a large portion of the operation cost of the spindle picker. The weight of the individual headers which contain all the picking machinery is another serious disadvantage since the number of headers that can be mounted on a harvesting machine is severely limited. Only by removing some of the component parts to reduce weight and thereby sacrifice picking efficiency can this disadvantage be somewhat overcome.

Accordingly, a need exists for a cotton harvesting machine which eliminates the problems associated with the conventionally used spindle picking machines. Thus, in accordance with the present invention, such problems are eliminated by utilizing a novel method of picking the mature cotton from the stalk in which less machinery is required, thereby reducing daily and seasonal servicing of the cotton harvesting machine and reducing the respective labor and machinery cost. Another advantage of the novel picking device of the present invention is the drastically reduced weight per header, allowing more headers to be mounted on each harvesting machine and thereby allowing a single machine to cover more acreage at greater speed than present machines, cutting both labor and fuel costs.

DISCLOSURE STATEMENT

Cotton harvesting machines, such as the spindle picker, have existed as far back as the turn of the 20th century. As described above, such machines include an endless carrier with rapidly rotating spindles. As the machine travels along the rows of cotton, the spindles enter the plants and gather the cotton, the spindles then being doffed and the cotton collected in suitable receivers. Examples of patented spindle picker cotton harvesting machines include U.S. Pat. No. 1,208,591, issued Dec. 12, 1916, to Lovejoy, and U.S. Pat. No. 2,143,901, issued Jan. 17, 1939, to Rust et al. U.S. Pat. No. 1,213,529, issued Jan. 23, 1917, to Neil, also discloses a cotton picker in which a rotating roller picks the mature cotton from the plant. U.S. Pat. No. 3,164,942, issued Jan. 12, 1965, to Middlesworth et al, discloses a fruit harvester having gathering fingers or spindles in which the fingers are adapted to be advanced into a tree and pursuant to rotation of the spindles to auger into the tree and then be withdrawn to strip the fruit off the plant. The fingers are shaped in the form of helical convolutions and each group of four spindles are arranged so that the crest of adjacent helically shaped spindles always oppose each other. No mention is made in the patent to Middlesworth et al of using the harvesting machine to pick cotton. The novel paired disk picking mechanism of the present invention is not taught by any of the above references and is considered to be an improved substitute for the spindle picking cotton harvesters.

SUMMARY OF THE INVENTION

Briefly, the cotton harvesting machine of the present invention utilizes a novel mechanism for separating the mature cotton from the cotton stalk or burr. The novel separating mechanism comprises a plurality of paired disks mounted for rotation about a central shaft, the harvesting machine including two or more columns of paired disks per header. Each opposed column of paired disks rotate in opposite directions so that the perimeters of each disk move in the same direction as the cotton plants pass through the picking area of the harvesting machine. Each disk of a disk pair is provided with a resilient opposing pad and is mounted so that opposed disks of a disk pair separate as the cotton plants are passing through the picking area and close to pinch the mature cotton between the opposed resilient pads, pulling the mature cotton from the stalk as the opposed disks rotate in the closed position. The opening and closing movement of the opposed paired disks is effected by a pair of opposed cams mounted in a stationary position around each central shaft. A separate cam follower attached for rotation about the central shaft and to one of the paired disks follows a specifically structured cam track placed on the cams to move each disk in position during rotation of the shaft.

During the picking operation, the cotton plant enters the picking area of the header as the harvesting machine travels through the rows of cotton. At this point, the opposed disks of each of the paired disks are in the open position so that the plant limbs are funneled between the pads of the opposed open disks. As the harvesting machine moves forward along the rows of cotton plants, the cotton plant in the picking area moves toward the back of the header at which point rotation of the central shaft causes the cam follower to close the opposed disks, squeezing the mature cotton with sufficient pressure to pull the cotton from the burr as movement of the cotton harvester and rotation of the central shaft continues. The pressure that the opposed pads exert on the cotton plant can be varied to meet changing field conditions by an adjustment device which various the relative position between opposed cams. After the cotton has been pulled from the burr, the disks continue to rotate to an appropriate place adjacent a vacuum area in the header whereupon the cam tracks for the opposed paired disks are such that the cam followers cause the opposed disks to open and through centrifugal force throw the cotton from between the opposed disks to a vacuum area which pulls the cotton into a storage area situated on the cotton harvesting machine.

Each row of paired disks are in the form of a circle about the central shaft, each row containing a plurality of upper and lower disks in which each disk is attached to the central shaft and is associated with its own cam follower positioned within the cam track. Each rotating column of paired disks in the header hold several rows of paired disks vertically spaced along the central shaft, the number of rows varying depending upon height requirements.

An object of the present invention is to provide a cotton harvesting machine which will eliminate the problems associated with conventional spindle pickers.

Another object of the invention is to provide a cotton harvesting machine which includes a novel mechanism to pull the mature cotton from the stalk or burr.

Another object of the present invention is to provide a novel picking mechanism which will require less daily and seasonal maintenance than cotton spindle pickers.

Still another object of the invention is to provide a novel picking mechanism which will drastically reduce the weight of a header placed on a cotton harvesting machine over conventional spindle pickers, allowing more headers to be mounted on each harvesting machine.

Still yet another object of the invention is to provide a cotton harvesting machine which includes a picking mechanism which is adjustable to meet varying field conditions.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a top plan view illustrating the arrangement of components within the header of the cotton harvesting machine of FIG. 1.

FIGS. 4A and 4B are fragmentary elevational views of the adjusting mechanism for altering the relative position between opposed cams, the dashed line illustrating phantom positions of the adjustment arms, the adjustment being indicated by the arrows.

FIG. 5 is an elevational view of the cam adjustment mechanism without the hand adjustable nut threaded onto the adjustment shaft.

FIG. 6 is a transverse sectional view of the cam adjustment device taken generally along the line 6—6 of FIG. 4B.

FIG. 7 is a transverse sectional view of the cam adjustment device taken generally along the line 7—7 of FIG. 5.

FIG. 8 is an exploded perspective view illustrating the disk support collar which supports the paired disks for rotation about the central shaft.

FIG. 9 is a transverse sectional view illustrating the cam follower and spring attachment to the individual disks.

DETAILED DESCRIPTION OF THE INVENTION

Figure 1:
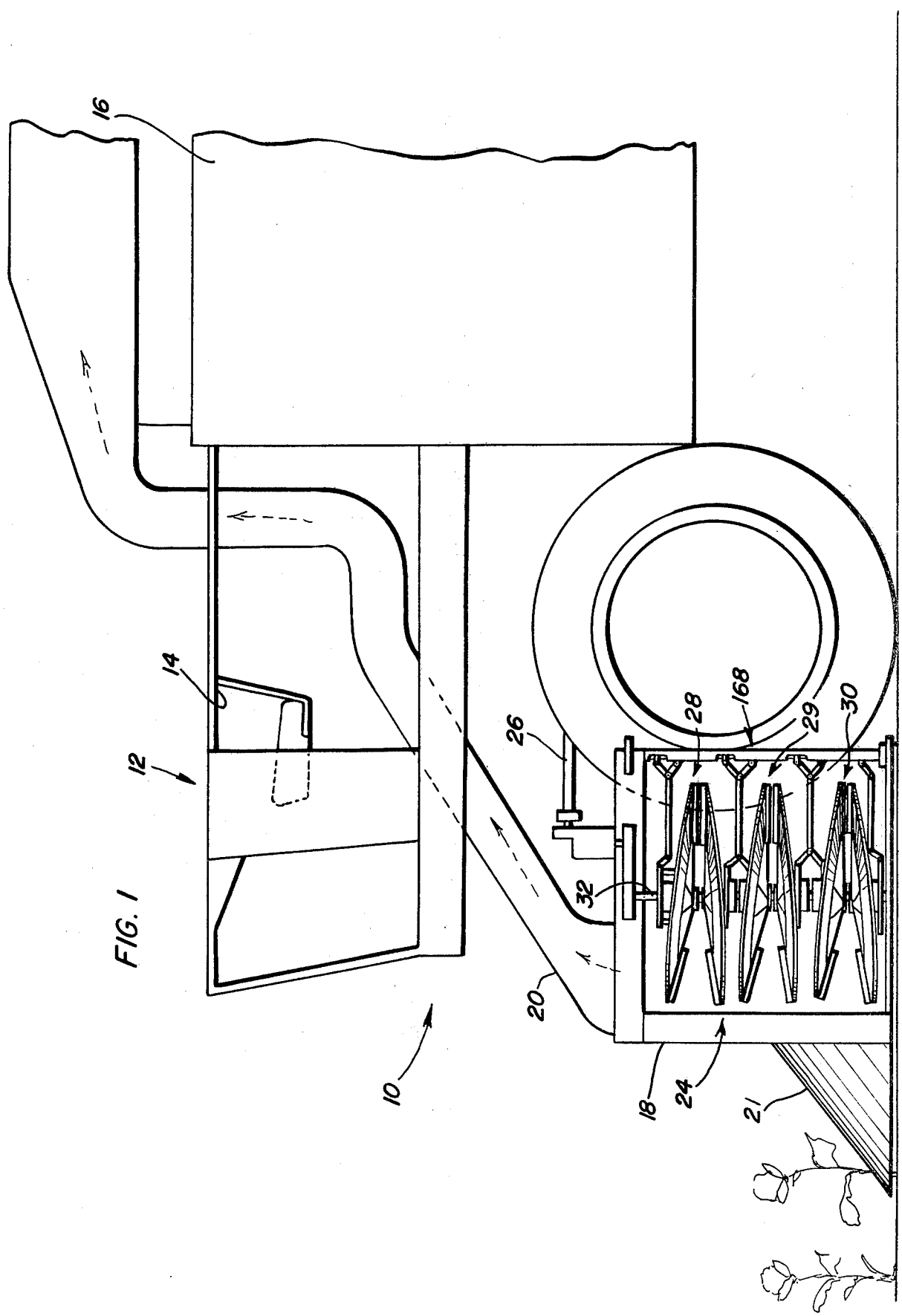
FIG. 1 is a side elevational view illustrating a cotton harvesting machine including the novel rotating paired disk picking mechanism of the present invention.

Referring now to FIGS. 1 and 2, cotton harvesting machine 10 includes an operator's station 12 including seat 14, storage area 16 for storing the picked cotton harvest, header 18, vacuum conduit 20 for directing the picked cotton into storage area 16, guards 21 and 22 which assist in directing the cotton plants into the picking area of header 18 and the novel picking mechanism 24 placed inside header 18 and operated by gear drive train 26 which is rotated from a power source (not shown) in cotton harvesting machine 10.

Picking mechanism 24 comprises three rows of paired disks, rows 28, 29 and 30 mounted and spaced vertically along a central rotating shaft 32 which is driven by gear train 26. The rows of paired disks form a single column about each rotating shaft 32 and 42. Each row of paired disks forms a circle surrounding the central shaft in which the individual disks forming the row are separately mounted to respective central shafts 32 and 42. In FIG. 2, it can be seen that each row is formed from eight disk pairs in which each disk is pie-shaped or triangular, such as disk 34. The side edges of each disk being contiguous with the adjacent disk, such as shown by disks 36, 38 and 40. The number of rows of paired disks in each column can be varied depending upon height requirements. Likewise, the number of each picking disk column per header can be varied and can include one, two columns, such as the picking disk columns disposed about central shafts 32 and 42 in FIG. 2, and even three or more disk columns per header.

As opposed to the spindle picking mechanism of conventionally used cotton harvesting machines, in which rotating spindles gather mature cotton from the plant, picking mechanism 24 of the present invention utilizes the opening and closing of each paired disk to funnel the cotton plant between the open paired disks and for gripping the mature cotton from the cotton plant as the paired disks close during movement towards the rear of the header.

Figure 3:
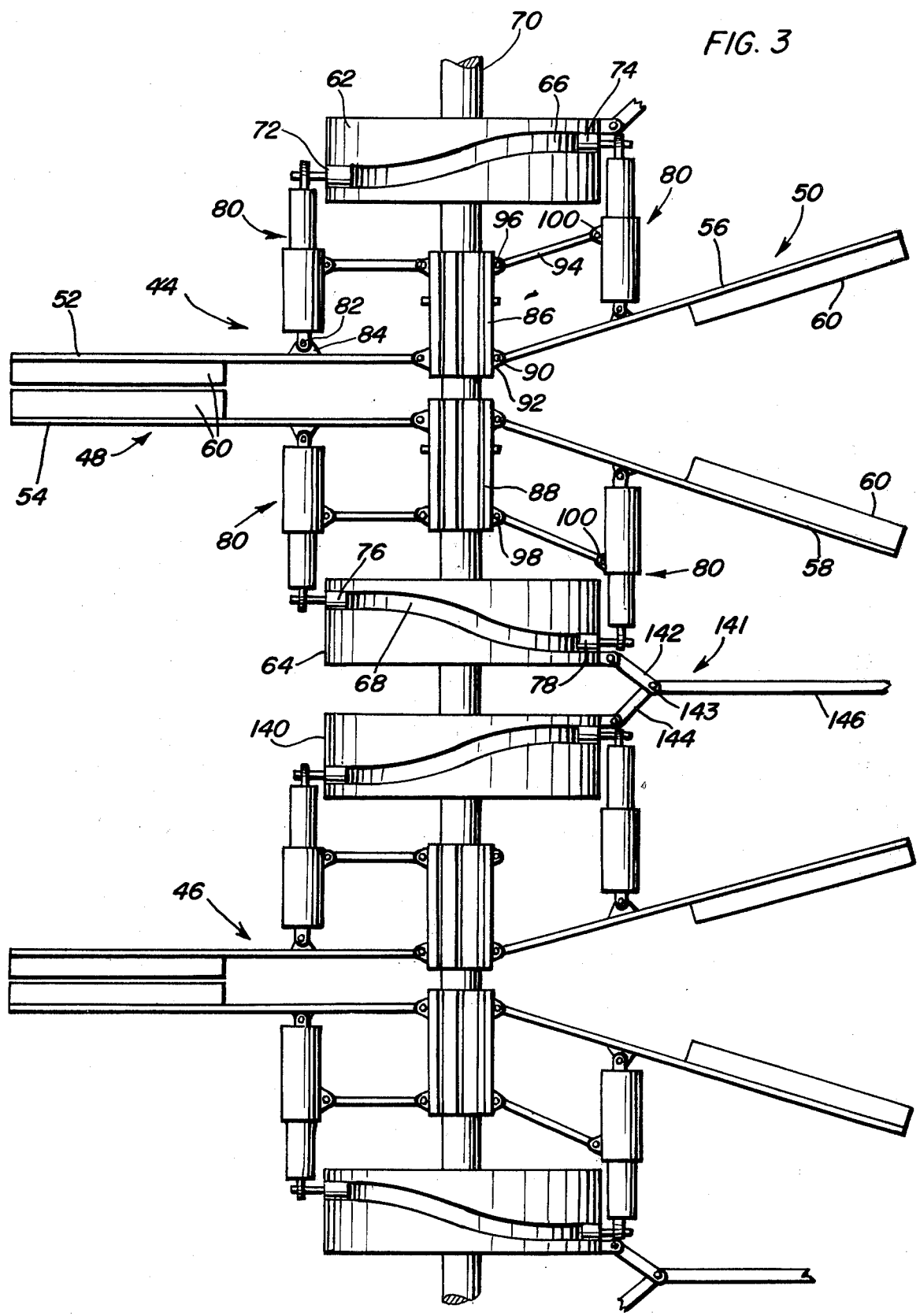
FIG. 3 is an enlarged fragmentary elevational view illustrating two of the novel disk pairs of the present invention in which one pair is in the fully open position and the other in the fully closed position.

FIG. 3 illustrates the structure utilized to move the paired disks into the open and closed position. Two rows of paired disks are shown, 44 and 46, only two of the disk pairs being shown per row, though it is to be understood that as many as eight disk pairs can exist per row to form a complete circle about the central shaft. Row 44 includes paired disks 48 and 50 in the closed and open positions, respectively. Paired disk 48 is formed from disks 52 and 54 while paired disk 50 is formed from disks 56 and 58. Each disk is provided with a rubber pad 60 which is fastened to the opposed faces of each disk pair. The use of pliable rubber allows pads 60 to grip and conform to a certain extent to the irregularities of the cotton plant, thus providing for increased picking efficiency. A pair of cams, 62 and 64, having contained therein cam tracks 66 and 68, respectively, are associated with the upper or lower disks of the disk pairs which form the paired disk row. Accordingly, cam 62 and cam track 66 guide upper disks 52 and 56 during rotation of shaft 70 by means of individual cam followers 72 and 74, respectively, while lower disks 54 and 58 are moved into the open and closed positions by respective cam followers 76 and 78 travelling in cam track 68 of cam 64. The movement of each disk pair will be explained with respect to disk pair 48. The movement of cam follower 72 in respective cam track 66, is transferred to disk 52 through spring loaded cam support 80, pivotally mounted to the upper face of disk 52 opposite the face containing rubber pad 60. Cam support 80 can be mounted to disk 52 by any conventional pivot means, such as a pivot pin 82, passing through a lug 84 secured to the upper face of disk 52. In a like manner, disk 54 is associated with cam follower 76. Cams 62 and 64 are mounted to central shaft 70 in a nonrotatable position, while disks 52 and 54 are mounted for rotation to shaft 70 via support collars 86 and 88, respectively, so that as central shaft 70 rotates, each individual cam follower moves in the respective cam track about the perimeter of the cam and through the respective cam supports moves each disk in a circle about the axis of rotation of central shaft 70. The cam tracks are structured in the respective cams so that during each rotation of the cam follower within the cam track, each paired disk is in the fully opened and fully closed positions only once. As can be seen in FIG. 3, paired disks 52 and 54 are in the fully closed positions, since cam followers 72 and 76 are positioned in respective cam tracks 66 and 68 at a location where the distance between the cam tracks is the smallest with respect to the remaining distances between the cam tracks along the perimeter thereof. Similarly, disks 56 and 58 are in the open position as their respective cam followers 74 and 78 are at a position along the perimeter of the respective cam tracks which comprises the greatest distance between the respective cam tracks. This position represents the fully opened position of the disk row.

Each upper and lower disk in the paired disk row is supported for rotation with central shaft 70 by respective upper and lower support collars, such as upper support collar 86 which supports disk segments 52 and 56 and lower support collar 88 which supports disks 54 and 58. Each individual disk is pivotally mounted to the respective support collar in any conventional manner, such as by a pivot pin 90 passing through lug 92 attached to the respective disk. To prevent the individual cam followers from binding in the cam track during rotation, each cam support 80 is maintained in a vertical position by means of a parallel linkage 94 pivotally mounted to each support collar. In FIG. 3, linkage 94 can be seen pivotally mounted to respective support collars 86 and 88 by means of pivots 96 and 98, respectively, and to the cam supports by means of pivots 100, each of which are preferably pins movable within a lug attached to the support collars.

FIG. 8 illustrates a support collar 102 equivalent to support collars 86 and 88 shown in FIG. 3. Support collar 102 is in the form of a hollow cylinder containing a hollow space 104 which enables the support collar to slip over the central rotating shaft. A roll pin placed through aperture 106 formed through the body of the support collar maintains the support collar firmly secured to the central shaft. Placed around the perimeter of disk support collar 102 are a plurality of elongated vertical grooves 108 placed along the full length of the support collar cylinder. Placed within each groove 108 is a hinge bar 110 fastened to support collar 102 by means of screw 112 through aperture 114 contained in hinge bar 110. Apertures 116 and 118 placed through hinge bar 110 are utilized for pivotally supporting either linkages 94 or one of the disks depending upon whether the support collar is used for mounting the upper or lower disk of the disk pair.

FIG. 9 illustrates cam support 80 for converting the movement of the individual cam followers in the cam tracks into the open and close movements of the attached disks. Cam support 80 includes a pair of interfitting cylinders 120 and 122 interconnected by means of a rigid spring 124 attached to cylinder 122 by means of hook 126 and to cylinder 120 by means of hook 128. Cylinder 122 contains a lug 130 which supports the cam follower indicated by reference numeral 132 for movement within cam track 134 of cam 136. Lug 138 attached to the bottom surface of cylinder 120 holds the pivot pin for pivotally mounting cam support 80 to the individual disk. Spring 124 allows some relative movement between interfitting cylinders 120 and 122 so that the individual picking disks can conform to the different types of materials passing between the paired disks. Pivot mechanism 100 for pivotally mounting cam support 80 to linkage 94 is fastened to the exterior of cylinder 120 by any conventional means, such as by welding, a strong adhesive, etc.

Referring back to FIG. 3, it is seen that attached to cam 64 of paired disk row 44 and cam 140 of paired disk row 46 is a yoke assembly 141 comprising a pair of pivotal linkages 142 and 144, attached to cams 64 and 140, respectively, the linkages being mounted to a connecting rod 146 at pivot point 143. By movement of connecting rod 146 to the right, cams 64 and 140 move closer together and consequently move the individual cams in respective paired disk rows a farther distance apart. Likewise, moving connecting rod 146 to the left moves the cam members of individual paired disk rows closer together. This vertical adjustment of the cams is an accessory which is used to position the cams at varying distances from the disks and which varies the amounts of spring pressure applied to the disk segments via spring 124 in cam support 80. Thus, the amount of squeezing or pulling action by the closed paired disks can be adjusted to meet varying field conditions. Connecting rod 146 and attached pivot arms 142 and 144 are part of a cam adjustment 148 illustrated in FIGS. 4 through 7. Cam adjustment 148 comprises a tube 150 enclosing a threaded shaft 152 containing threads 154. A hand adjustable nut 156 moves threaded shaft 152 relative to the surrounding tube 150. Yoke assembly 158 is pivotally fastened to connecting rod 146 at pivot point 147 and includes arm 160 fastened to shaft 152 and arm 162 fastened to outer tube 150. Arms 160 and 162 are pivotally mounted to support arms 164 and 166, respectively, each arm 164 and 166 being mounted at pivot point 147 to connecting rod 146. Referring to FIG. 4A, as threaded shaft 152 is moved further into tube 150 by means of nut 156, arms 160 and 164 are moved closer to arms 162 and 166 causing a scissoring action whereby connecting arm 146 is moved toward the cams causing attached linkages 142 and 144 to scissor outwardly from pivot point 143 bringing the pair of cams in each row of paired disks closer together, FIG. 3. Likewise, pulling shaft 152 out of 150 causes yoke assembly 158 to spread further apart as shown in FIG. 4B causing connecting rod 146 to pull away from the attached cams causing the individual cams in each paired disk row to separate. FIGS. 5–7 show that arms 160 and 162 can be attached to shaft 152 and tube 150, respectively, by means of lugs 167 screwed or welded thereto.

Referring again to FIGS. 1 and 2, header 18 is shown containing two columns of paired disk rows. Each column comprises three rows of paired disks equivalent to the structure set forth in FIG. 3 and includes a cam adjustment 168 equivalent to that shown in FIGS. 4A and 4B. Header 18 also includes vacuum areas 170 and 172 which communicate with vacuum conduit 20 to direct the pulled cotton into storage area 16. Plant dividers 174 and 176 funnel the cotton plant limbs between the paired disks rotating about respective shafts 32 and 42. Vacuum areas 170 and 172 are bounded by shields 178 and 180, respectively, the ends of each shield protruding between the open disks to prevent the picked cotton from being carried back into the picking area. Shields 182 and 184 positioned at the back of the header are used as buffers to ease the cotton limbs back into the picking area.

Operation of a cotton harvesting machine manufactured in accordance with the teachings of the present invention will be described with respect to FIGS. 1 and 2 which illustrate cotton harvesting machine 10 containing picking mechanism 24. Picking mechanism 24 comprises a pair of columns picking disks, each column containing three rows of paired disks, rows 28, 29 and 30 each constructed in an equivalent manner to the picking mechanism illustrated in FIG. 3. As cotton harvesting machine 10 moves forward, the cotton plants are funneled into the space between the columns with the aid of guards 21 and 22 and plant dividers 174 and 176. Rotation of central shafts 32 and 42 by a drive mechanism (not shown) in cotton harvesting machine 10 also rotates the individual paired disks which are opened and closed by movement of the cam followers in the cam tracks as described above. Area A, as shown in FIG. 2, is the picking area where the rubber pads on the paired disks are closed completely applying pressure to the plant limbs to pull the mature cotton from the burrs as shafts 32 and 42 continue rotation. Area B is a transitional area in which the cotton is released from between the closed pads as the paired disks start to separate due to the diverging direction of the respective cam tracks. The paired disk segments go from a fully closed to a fully opened position at the end of area B adjacent vacuum areas 170 and 172, the cotton being thrown by centrifugal force into the vacuum area. In area C, the paired disk segments are fully open. Area D is the other transitional area whereby the disks go from the fully open position to the closed position as the plant limbs come between the pads to complete the cycle. During movement of harvesting machine 10 through the rows of cotton plants, a constant vacuum is being applied to pull the pulled cotton from the vacuum area into storage area 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A harvesting machine for cotton comprising means including a pair of opposed disks capable of gripping a cotton plant therebetween and pulling the cotton off the plant, means for separating the paired disks to allow the cotton plant to enter therebetween and then close the paired disks once the cotton plant is in the picking area, said paired disks being mounted for rotation on a rotating shaft, drive means for said rotating shaft, said paired disks comprising an upper disk and a lower disk, said means for separating and closing said disks comprising at least one cam containing a cam track and a cam follower associated with one of said upper or lower disks and said cam track.

2. The machine of claim 1 wherein the gripping and pulling means are mounted for rotation about a central shaft, said means for separating and closing said picking means causing said gripping and pulling means to be in the fully opened and fully closed positions only once during a single revolution of said shaft.

3. The machine of claim 2 wherein said machine comprises a plurality of said central shafts, each of said shafts comprising a plurality of picking means associated therewith.

4. The machine of claim 1 wherein said rotating shaft is a vertical shaft and said machine includes a plurality of paired disks to form at least a single row of paired disks along the vertical extent of said shaft.

5. The machine of claim 1 wherein said rotating shaft contains more than one row of paired disks, said rows of paired disks being spaced vertically along said shaft.

6. A harvesting machine for cotton comprising a mechanism for picking the mature cotton from the cotton plant, said picking mechanism including a plurality of pairs of opposed disks capable of gripping the cotton plant therebetween and pulling the cotton off the plant and said picking mechanism further including means for separating the paired disks to allow the cotton plant to enter therebetween and then close the paired disks once the cotton plant is in the picking area, said paired disks being mounted for rotation on a vertical rotating shaft, drive means for said rotating shaft, said plurality of paired disks forming at least a single row of paired disks along a vertical extent of said rotating shaft, said rotating shaft containing more than one row of paired disks, said rows of paired disks being spaced vertically along said shaft, said paired disks comprising an upper disk and a lower disk, said means separating and closing said disks comprising at least one cam means containing a cam track and a cam follower associated with one of said upper or lower disks and said cam track.

7. The machine of claim 6 wherein each of said upper and lower disks are associated with upper and lower cams, each cam comprising a cam track and a cam follower associated with the respective disk.

8. The machine of claim 7 wherein said cams are placed in a stationary position about said rotating shaft, said cam track being positioned about the perimeter of said cam, said cam follower rotating with the rotation of said paired disks following said track about the perimeter of said cam.

9. The machine of claim 8 wherein said cam follower is associated with said disk by a spring loaded means.

10. The machine of claim 9 wherein said spring loaded means is pivotally mounted to said disk.

11. The machine of claim 10 wherein said disk is pivotally mounted to said rotating shaft.

12. The machine of claim 11 wherein said spring loaded means is pivotally mounted to said shaft to maintain said spring loaded means in a vertical position parallel with said shaft eliminating binding of said cam follower in said cam track.

13. The machine of claim 12 wherein each of said upper and lower disks of a disk pair contain a flexible pad thereon so that the flexible pads of a paired disk oppose each other and grab the cotton plant therebetween.

14. The machine of claim 13 wherein during a single rotation of said paired disks about said central shaft, said paired disks are fully opened and fully closed once.

15. The machine of claim 14 including a means to adjust the positions of said cams in a row of paired disks, said adjusting means moving said cams vertically along said rotating shaft.

16. The machine of claim 15 wherein each row of paired disks comprises a circular ring about said central shaft.

17. The machine of claim 16 wherein said upper and lower disks are attached to respective upper and lower disk support collars positioned around said central shaft, each disk being pivotally mounted to a respective support collar, said spring loaded means being pivotally mounted to said support collar to maintain said spring loaded means in a vertical position during complete rotation of said disk around said shaft.

* * * * *